(No Model.)
H. S. FONTAINE.
Shaft Coupling.
No. 233,225. Patented Oct. 12, 1880.
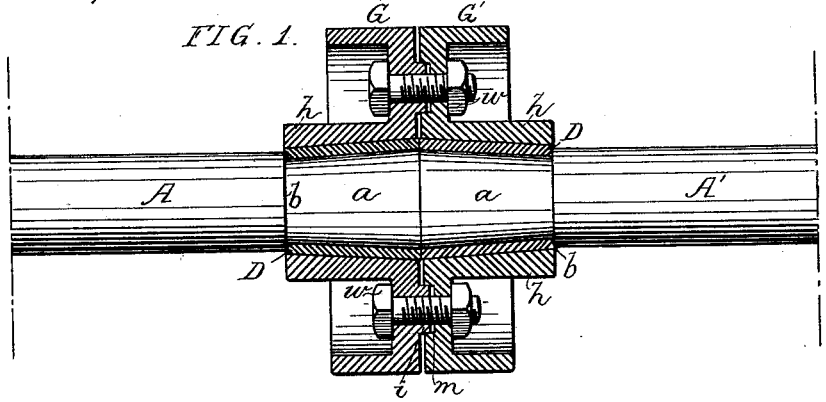
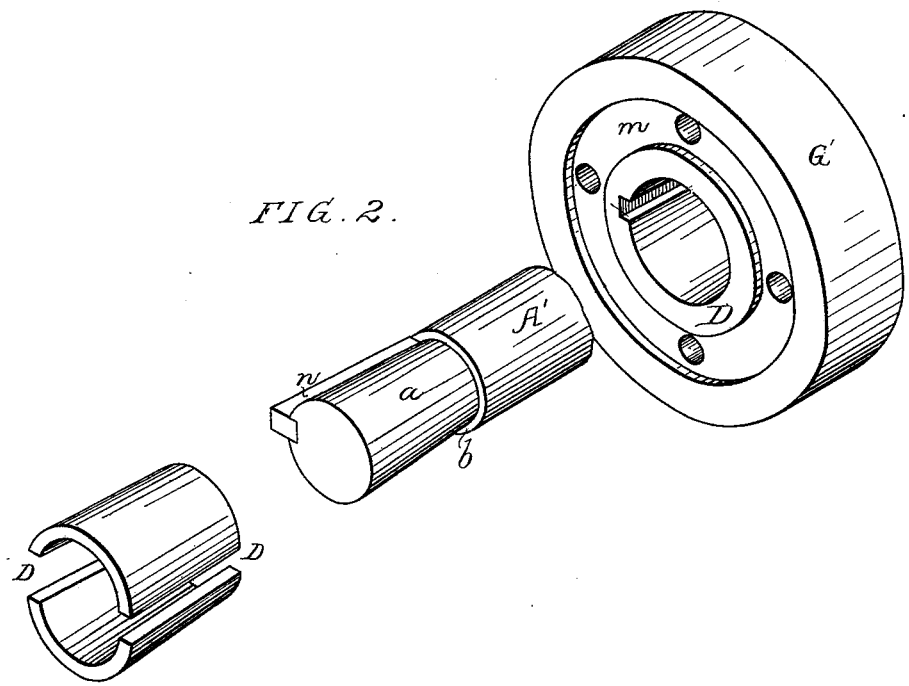
WITNESSES:
Henry L. Fulenwider,
Henry Howson, Jr.
INVENTOR:
Henry S. Fontaine,
by his attorneys,
Howson and Son.

UNITED STATES PATENT OFFICE.

HENRY S. FONTAINE, OF PHILADELPHIA, PENNSYLVANIA, ASSIGNOR OF ONE-HALF OF HIS RIGHT TO JOHN B. FONTAINE, OF SAME PLACE.

SHAFT-COUPLING.

SPECIFICATION forming part of Letters Patent No. 233,225, dated October 12, 1880.

Application filed September 10, 1880. (No model.)

*To all whom it may concern:*

Be it known that I, HENRY S. FONTAINE, a citizen of the United States, residing in Philadelphia, Pennsylvania, have invented an Improvement in Shaft-Couplings, of which the following is a specification.

My invention consists of a shaft-coupling constructed in the peculiar manner fully described hereinafter, for the purpose of insuring a perfect junction of two adjoining shafts, and for the purpose of affording facilities for the ready disconnection of the said shafts.

In the accompanying drawings, Figure 1 is a section of my improved coupling, the shafts being in elevation, and Fig. 2, perspective views of one of the coupling-rings, the end of one of the shafts, and one of the severed tapering sleeves.

A and A' are portions of adjoining shafts, and the portion $a$ of each shaft is reduced in diameter and to the tapering form shown. To the said tapering portion $a$ of each shaft is fitted a tapering severed sleeve, D, which is of exactly the same length as the tapering portion of the shaft, so that when the large end of the sleeve is flush with the outer end of the shaft the small end of the sleeve will be in contact with the shoulder $b$, formed on the shaft by its reduction in diameter.

G and G' are the two flanged coupling-rings, the hub $h$ of one ring having a tapering bore adapted to the exterior of the severed sleeve of one shaft, and the other having a similar bore adapted to the sleeve of the other shaft, and one coupling-ring has an annular projection, $i$, concentric with the bore, and adapted to a corresponding annular recess, $m$, in the other ring.

I prefer to secure to each tapering portion $a$ of the shaft a feather or spline, $n$, the interior of the hub of each coupling-ring having a groove or keyway corresponding with the feather, and the two portions of each severed sleeve being so reduced at the edges that the feather shall not interfere with the tight fitting of the sleeve to the said tapering portion of the shaft.

If desired, a single feather or spline of a length equal to the portions $a$ of both shafts may be substituted for the two splines, one carried by each shaft.

Bolts $w$—four in the present instance—pass through the coupling-rings, and on tightening the nuts of these bolts the two rings will be forced toward each other; but in no case should the rings be permitted to come in contact with each other.

The tightening of the nuts of the bolts causes the sleeves to embrace the tapering ends of the shafts with great force, and at the same time causes the ends of the two shafts to forcibly butt against each other. In fact, there is such a junction of the two shafts that, while the proper coincidence and concentricity in respect to each other are assured, longitudinal displacement is rendered impossible, owing to the taper given to the shafts, the severed sleeves, and interior of the hubs of the coupling-rings.

A prominent advantage of my invention is the facility which the coupling affords for fitting wheels, pulleys, &c., to the shafts, for, after the bolts which secure the coupling-rings have been withdrawn, both rings and sleeves will be free without any of that driving and forcing of parts which has to be resorted to in disconnecting other couplings.

After the coupling-rings and sleeves have been detached from the shafts, pulleys, wheels, &c., may be easily slipped onto the same, as the extreme outer end of the tapering portion $a$ of each shaft is slightly less in diameter than the body of the shaft.

While in some cases the feathers $n$ might be dispensed with, owing to the firm gripe of the shafts by the coupling, the feathers are to be preferred in a majority of cases.

It is immaterial to my invention what provision is made or appliances used for drawing the two coupling-rings together, but the bolts shown serve the desired purpose well.

I claim as my invention—

1. A shaft-coupling in which two coupling-rings with taper bores and two tapering severed sleeves adapted to the said bores are combined with the tapering ends of two adjoining shafts, and with devices by which the said rings may be drawn toward each other, all substantially as set forth.

2. The combination of the coupling-rings having tapering and grooved bores, and the severed sleeves, with shafts having tapering ends provided with feathers adapted to the grooves of the rings, substantially as specified.

In testimony whereof I have signed my name to this specification in the presence of two subscribing witnesses.

HENRY S. FONTAINE.

Witnesses:
    JAMES F. TOBIN,
    HARRY SMITH.